(12) United States Patent
Tohara

(10) Patent No.: US 8,708,850 B2
(45) Date of Patent: Apr. 29, 2014

(54) LINK PLATE

(75) Inventor: Takashi Tohara, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 238 days.

(21) Appl. No.: 12/986,406

(22) Filed: Jan. 7, 2011

(65) Prior Publication Data

US 2011/0183800 A1    Jul. 28, 2011

(30) Foreign Application Priority Data

Jan. 26, 2010    (JP) .................................. 2010-014446

(51) Int. Cl.
*F16G 13/02*    (2006.01)
(52) U.S. Cl.
CPC .................................... *F16G 13/02* (2013.01)
USPC ........................................................ 474/206
(58) Field of Classification Search
CPC ............. F16G 1/00; F16G 1/22; F16G 13/00; F16G 13/02; F16G 13/06; F16G 13/18; F16G 3/00; F16G 5/00; F16G 5/163; F16G 15/00; F16G 15/12; F16G 15/14
USPC ......... 474/111, 206, 212, 213, 157, 249, 250, 474/251, 237, 203, 202; 184/11.5, 15.1, 61
See application file for complete search history.

(56) References Cited

U.S. PATENT DOCUMENTS

| | | | | | |
|---|---|---|---|---|---|
| 867,208 | A | * | 9/1907 | McIntyre | 474/213 |
| 3,020,942 | A | * | 2/1962 | Hill | 83/831 |
| 6,220,981 | B1 | * | 4/2001 | Yoshida | 474/111 |
| 6,743,134 | B2 | * | 6/2004 | Okabe et al. | 474/213 |
| 6,992,254 | B2 | * | 1/2006 | Komiya | 174/138 B |
| 7,419,449 | B2 | * | 9/2008 | Tohara et al. | 474/213 |
| 7,585,239 | B2 | * | 9/2009 | Miyazawa | 474/157 |
| 8,192,313 | B2 | | 6/2012 | Ispolatova et al. | |
| 2004/0138020 | A1 | * | 7/2004 | Meyer | 474/206 |
| 2006/0175137 | A1 | * | 8/2006 | Alves et al. | 187/254 |
| 2007/0142150 | A1 | * | 6/2007 | Vietoris | 474/212 |
| 2008/0020882 | A1 | * | 1/2008 | Tohara et al. | 474/212 |
| 2009/0181816 | A1 | * | 7/2009 | Ispolatova et al. | 474/229 |

FOREIGN PATENT DOCUMENTS

| | | | | |
|---|---|---|---|---|
| JP | 62840 | | 1/1987 | |
| JP | 2002156002 A | * | 5/2002 | ............. F16G 13/06 |
| JP | 2007162823 | * | 6/2007 | ............. F16G 13/06 |
| WO | 2009076924 A1 | | 6/2009 | |

* cited by examiner

*Primary Examiner* — Sang Kim
*Assistant Examiner* — Juan Campos, Jr.
(74) *Attorney, Agent, or Firm* — Howson & Howson LLP

(57) ABSTRACT

A link plate for a transmission chain composed of a plurality of link plates flexibly connected to one another has a guide-contacting edge for direct sliding contact with a chain guide. The guide-contacting edge is composed of a plurality of surface portions in alternating relationship with a plurality of grooves along the direction of chain travel.

5 Claims, 6 Drawing Sheets

Direction of traveling the chain →

Direction of traveling the chain →

Direction of traveling the chain r  f

LINK PLATE

CROSS REFERENCE TO RELATED APPLICATIONS

This application claims priority on the basis of Japanese Patent Application No. 2010-014446, filed on Jan. 26, 2010. The entire disclosure of Japanese Patent Application No. 2010-014446 is herein incorporated by reference.

FIELD OF THE INVENTION

This invention relates to a link plate of a chain, the link plate having an edge that is elongated in the direction of chain travel and slides in direct contact with the surface of a chain guide.

BACKGROUND OF THE INVENTION

A timing chain is composed of a number of link plates flexibly connected to one another to form an endless chain. The chain is driven by a sprocket on an engine crankshaft and in driving relationship with a sprocket on an engine camshaft, or with a plurality of sprockets in the case of an engine having more than one camshaft. The chain is typically guided by being in sliding relationship with a pivoted tensioner lever a fixed chain guide, or a combination thereof.

Hitherto, link plates having sliding edge surfaces that travel in direct contact with guide members have been designed for reduced friction between their guide-engaging edges and the cooperating guide surfaces in order to reduce vibration and noise, to improve durability, to reduce wear and heat, and to reduce the size and weight of the chain.

One known link plate is formed so that its edge which slidably contacts the guide member is convex toward the guide member in order to reduce the sliding area and thereby reduce friction. In another known link plate, concave grooves for retaining lubricant oil are provided on the guide-engaging edge to improve lubricant retention. These known link plates are disclosed in United States patent application publication 2008/020882.

Although the known link plate having a convex edge has a reduced sliding area and can reduce sliding friction, its performance is dependent on various conditions such as the speed of travel of the chain, transmission torque, and the viscosity of the lubricating oil. Under some operating conditions, depletion of lubricating oil can occur, resulting in vibration and excessive heat. Accordingly, it has been difficult to fabricate reliable link plates because of interrelationship between their shapes and the conditions of their operation.

In the case of link plates having concave grooves for retaining lubricant oil on their guide-engaging edges, it has been difficult to obtain optimum reduction in sliding friction because of the problem of lubricant depletion that the grooved link plates share with the link plates having convex edges, and also because of the difficulty in achieving a stable and homogeneous supply of lubricant to the link plates in the widthwise and traveling directions.

SUMMARY OF THE INVENTION

This invention addresses the aforementioned problems by providing a link plate in which durability and sliding resistance are reduced, in which reduction of vibration, noise, wear, and heat, are improved substantially independently of conditions such as the traveling speed of the chain, transmission torque and lubricant viscosity, and which enables the size and weight of the chain to be reduced without impairing its durability and performance.

The link plate according to the invention is a link plate for a chain composed of a plurality of link plates flexibly connected to one another. The link plate has a guide-contacting edge for direct sliding contact with a chain guide. The guide-contacting edge is composed of a plurality of surface portions in alternating relationship with a plurality of grooves along the direction of chain travel.

The area of the link plate's guide-contacting edge that directly contacts the guide is reduced by the grooves, and the grooves also retain lubricant. Accordingly sliding resistance is reduced, and it also becomes possible to provide a stable supply of lubricant to the guide-contacting surface portions in the widthwise and traveling directions of the chain. Accordingly a shortage or failure of lubrication can be avoided, vibration, noise, wear and heating of the link plates can be reduced independently of various conditions such as variations in the speed of travel of the chain, transmission torque, and lubricant viscosity. The grooves also make it possible to improve durability and to reduce the size and weight of the chain without degrading its performance.

The guide-contacting edge can be made convex, i.e., formed so that its central part along the direction of travel protrudes slightly toward the guide. In such a case, the configuration of the guide-engaging edge can be such that not all of the plurality of surface portions provided formed by division of the guide-engaging edge by means of grooves contact the guide. This further reduces the sliding contact area and thereby further reduces sliding resistance, effecting further improvements in reduction of vibration, noise, wear and heat, and further improvements in durability, and in the ability to achieve weight and size reduction.

In another embodiment in which the guide-engaging edge includes surface portions that can come into direct sliding contact with a guide surface and surface portions that do not come into direct sliding contact with a guide surface, grooves that are adjacent surface portions that can come into direct sliding contact with a guide surface are deeper than grooves adjacent surface portions that do not come into direct sliding contact with a guide surface. The deeper grooves retain more lubricant oil where it is most needed, and more effectively avoids loss of, or shortage, of lubricant, and achieve further improvements in reduction of vibration, noise, wear and heat, and further improvements in durability, and in the ability to achieve weight and size reduction.

In another embodiment in which the guide-engaging edge includes surface portions that can come into direct sliding contact with a guide surface and two surface portions that do not come into direct sliding contact with a guide surface, each of the two surface portions that do not come into direct sliding contact with a guide surface is continuous and not divided by grooves. Here, the number of grooves is reduced, making fabrication of the link plate easier. Deformation of the link plate and internal stresses produced in the fabrication process are also suppressed, and further advantages in durability weight reduction and size reduction can be achieved.

In still another embodiment in which the guide-engaging edge is elongated in the direction of chain travel each of the grooves deviates from a direction orthogonal to the direction of chain travel. Flux of the lubricant occurs within the grooves as the chain travels, lubricant is supplied more smoothly and stably, loss of lubrication or shortage of lubricant between the link plate and the guide is more reliably avoided, and further improvements in reduction of vibration, noise, wear and heat, and further improvements in durability, and in the ability to achieve weight and size reduction can be realized.

In still another embodiment, the transverse cross-sectional shape of each groove is asymmetric and formed so that the distance between the front edge of the groove in the direction of travel and the deepest portion of the groove is shorter than the distance between the rear edge and the deepest portion. Here, lubricant is supplied smoothly and stably because of the gradual angle of the trailing part of the groove relative to the direction of travel. Accordingly, loss of lubrication or shortage of lubricant between the link plate and the guide is reliably avoided, and further improvements in reduction of vibration, noise, wear and heat, and further improvements in durability, and in the ability to achieve weight and size reduction can be realized.

Finally, in still another embodiment, the transverse cross-sectional shape of each groove has an area larger than the area of a triangle formed by connecting the front and rear edges of said groove with the deepest portion of said groove by straight lines. In this embodiment, more lubricant oil can be retained in the grooves. Accordingly, loss of lubrication or shortage of lubricant between the link plate and the guide is more reliably avoided, and further improvements in reduction of vibration, noise, wear and heat, and further improvements in durability, and in the ability to achieve weight and size reduction can be realized.

DETAILED DESCRIPTION OF THE PREFERRED EMBODIMENTS

Figure 1:
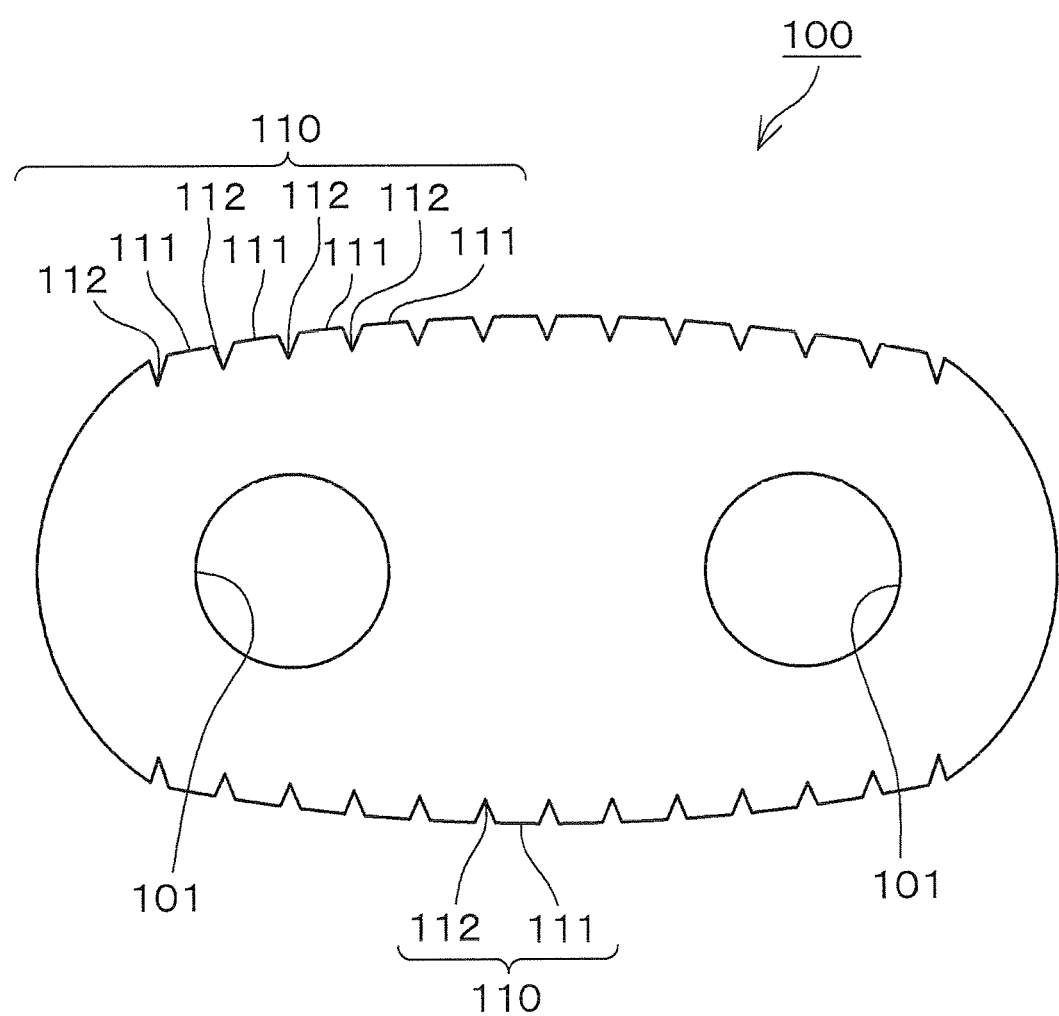
FIG. 1 is a side elevational view of a link plate according to a first embodiment of the invention.

As shown in FIG. 1, the link plate 100 according to a first embodiment of the invention is substantially oval in side elevation and has two pin holes 101 spaced from each other in the longitudinal direction of the chain.

A transmission chain can be composed of a large number of link plates 100, arranged in rows which are interleaved with one another and articulably connected by connecting pins or bushings which extend through the pin holes 101.

Figure 2:
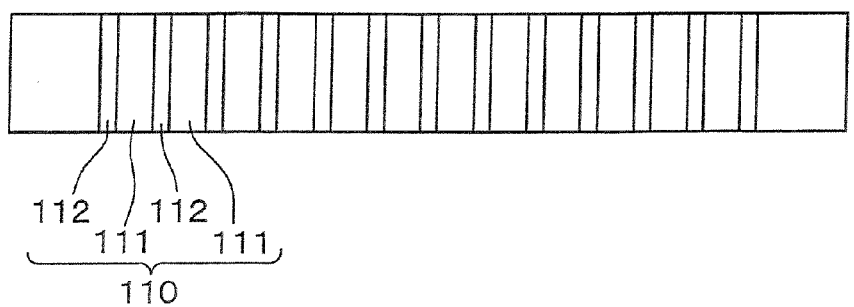
FIG. 2 is a plan view of the link plate in FIG. 1.

Upper and lower edges of the link plate 100 are formed into surfaces 110 that come into direct sliding contact with guide members, such as a fixed or pivoted chain guide as the chain travels in a circulating path about a set of sprockets. Surface 110 is divided into a plurality of guide-engaging portions 111 by a plurality of grooves 112. The guide-engaging portions 111 and the grooves 112 are disposed in an alternating arrangement along the direction of travel of the chain as shown in FIG. 2. As shown in FIG. 1, the surfaces 110 are also slightly convex in profile. That is, the central parts of surfaces 110 are farther than other parts of the surfaces 110 from an imaginary centerline extending from the center of one the pin holes 101 to the center of the other pin hole. Because of the convex shape of each of surfaces 110, its central part is capable of contacting a guide member while parts in front of and behind the central part along the direction of chain travel can be slightly spaced from the guide member.

Figure 3A:
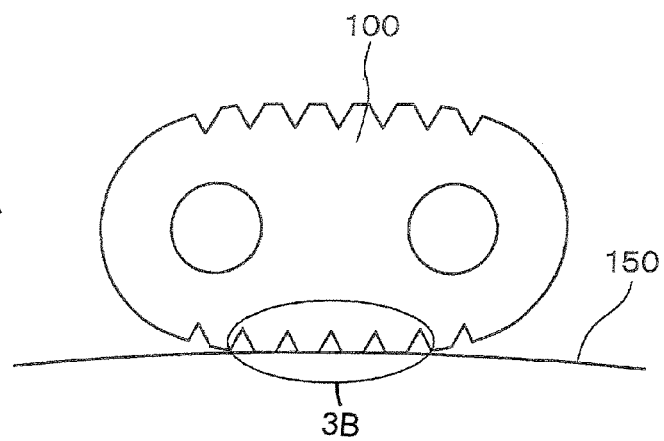
FIG. 3A is a schematic side elevational view illustrating how the link plate in FIG. 1 contacts a guide member.
Figure 3B:
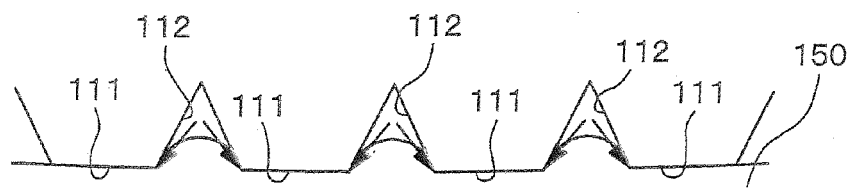
FIG. 3B is an enlarged schematic side elevational view of the portion of FIG. 3A within oval 3B in FIG. 3A.

Because the link plate 100 is provided with grooves 112, only the portions 111 of the edge surfaces come into direct contact with the guide member 150, as shown in FIGS. 3A and 3B. Thus, the sliding contact area is reduced when compared to the sliding contact area of a similarly shaped link plate having no grooves. Consequently, the sliding resistance between the link plates and the guide 150 is decreased.

Lubricating oil is also retained in the grooves 112, and is therefore the lubricant oil always present in front of the guide-engaging portions 111 as the link plate 100 travels. Because the grooves 112 extend widthwise from one side of each link plate to the other as shown in FIG. 2, and divide the surface 110 into multiple guide-engaging portions 111 a stable supply of lubricating oil is provided by the grooves 112 to the entire surface of each of the guide-engaging portions 111 in the widthwise direction as the chain travels in sliding contact with a guide 150.

When the link plate 100 slides along, and presses against the guide surface 150, a deformation of the guide surface occurs, whereby portions of the guide surface bulge slightly into the insides of the grooves 112. FIG. 3B shows this deformation in an exaggerated manner for the purpose of illustration. The slight bulging of the guide surface causes lubricating oil retained in the grooves 112 to be supplied as shown by arrows in FIG. 3B.

Figure 4:
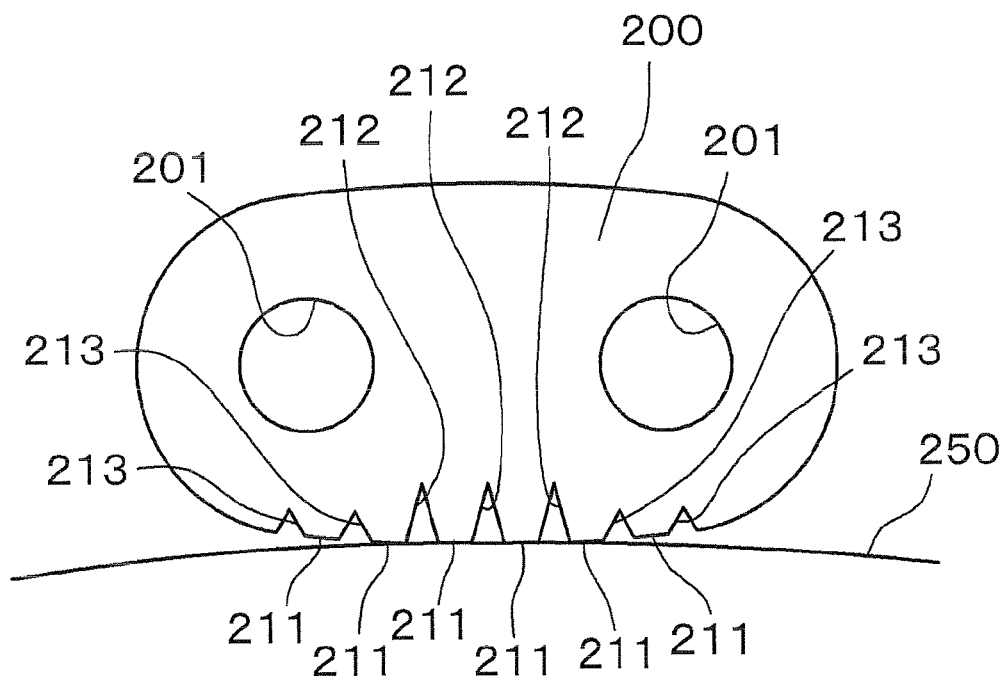
FIG. 4 is a side elevational view of a link plate according to a second embodiment of the invention.

In a second embodiment, shown in FIG. 4, a link plate 200 is similar to link plate 100 in that it has a substantially oval profile, and two pin holes 201, spaced from each other in the longitudinal direction of the chain. As in the first embodiment, a transmission chain can be composed of a large number of link plates 200, arranged in rows interleaved with one another and articulably connected by connecting pins or bushings which extend through the pin holes 201.

In the second embodiment, only one edge of the link plate 200 travels in direct contact with a guide 250. This edge is divided into a plurality of surface portions 211 by alternating grooves which are spaced from one another in the direction of travel of the chain. Some of the grooves are deep grooves 212, and others are shallow grooves 213.

The guide-engaging edge is also slightly convex so that only the centrally located surface portions 211 slide directly against the guide member 250. The deep grooves 212 are located adjacent the centrally located surface portions 211 that directly contact the guide member 250. The shallow grooves 213 are located in the parts of the guide-engaging edge that are closer to the ends thereof and that do not directly contact the guide member 250.

A greater amount of lubricating oil can be retained in the deeper grooves 212 adjacent the surface portions 211 that require more lubricant. Accordingly, the link plate avoids a shortage of lubricant where it is required, and reduces vibration, noise, wear, and heating of the chain, improving durability and making it possible to reduce the size and weight of the chain without degrading its performance.

Although the link plate 200 in FIG. 4 has no grooves on its upper edge, the upper edge may be provided with grooves similar to those in the lower edge.

Figure 5:
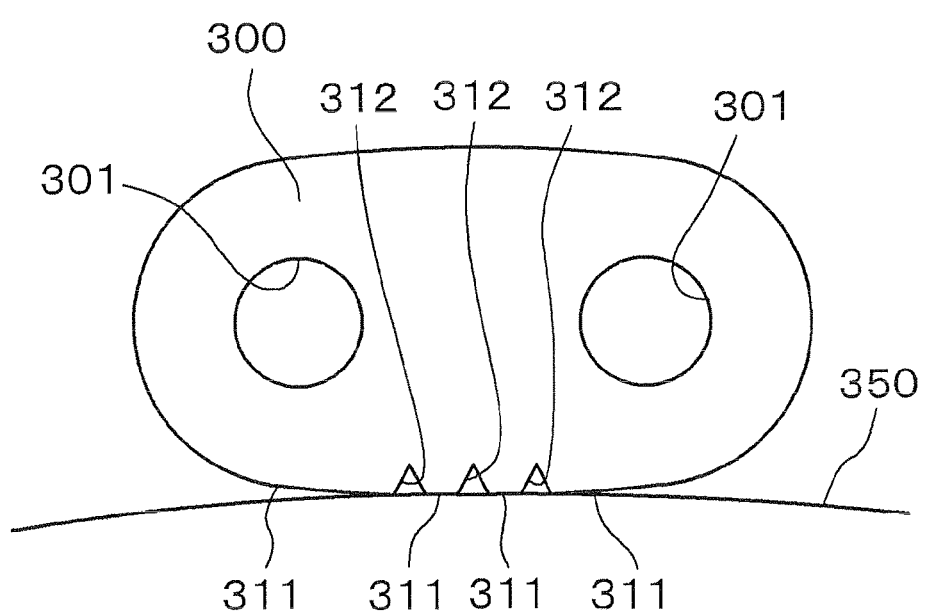
FIG. 5 is a side elevational view of a link plate according to a third embodiment of the invention.

In a third embodiment, shown in FIG. 5, a link plate 300 is similar to link plate 200 in that it has a substantially oval profile, and two pin holes 301, spaced from each other in the longitudinal direction of the chain. As in the first and second embodiments, a transmission chain can be composed of a large number of link plates 300, arranged in rows interleaved with one another and articulably connected by connecting pins or bushings which extend through the pin holes 301.

The edge of the link plate 300 that travels in direct contact with guide 350 is divided into a plurality of surface portions 311 by plurality of grooves 312 spaced from one another in the direction of travel of the chain.

As in the previously described embodiments, the profile of the guide-engaging edge of the link plate is slightly convex. As a result, the surface portions 311 that are centrally located along the longitudinal direction contact the guide member 350, while surface portions near the ends of the guide-contacting edge are spaced slightly from the surface of the guide member.

The grooves 312 are provided only in the part of the edge adjacent the central surface portions 311 that directly contact the guide member 350. No grooves are provided in the parts of the edge of the link plate that do not directly contact the guide member 350.

The absence of grooves in the surface portions that do not directly contact the guide member 350 allows the link plate to be fabricated more easily, and also reduces deformation and internal stress caused in the process of forming the grooves. Accordingly, improved durability, size reduction and weight reduction of the chain can be realized.

In the third embodiment shown in FIG. 5, as in the case of the second embodiment shown in FIG. 4, the link plate can be provided with the similar grooves on its upper edge.

Figure 6:
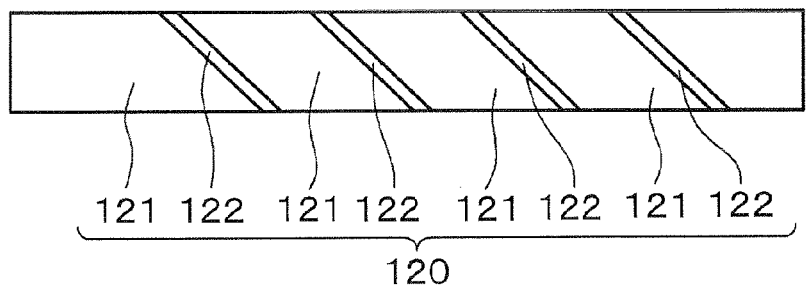
FIG. 6 is a plan view of a first modification of the grooves of a link plate according to the invention.
Figure 7A:
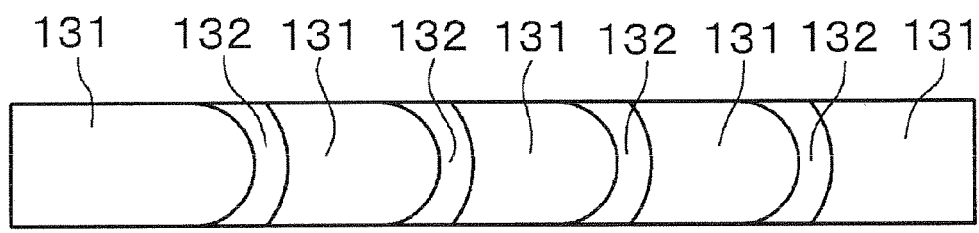
FIGS. 7a and 7b are plan views of other modifications of grooves of a link plate according to the invention.
Figure 7B:
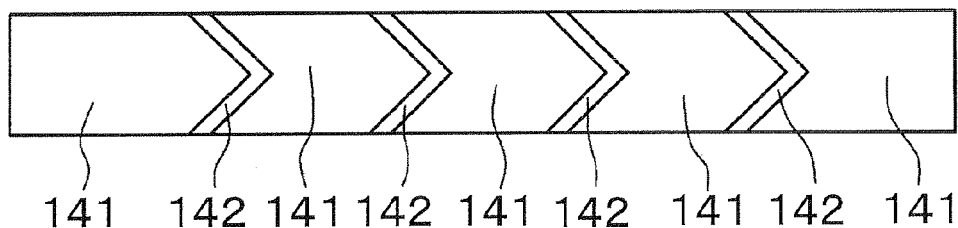

Various modifications of the groove of the link plate of the invention are illustrated in FIGS. 6-7b, wherein the grooves deviate from a direction orthogonal to the direction of chain travel.

In FIG. 6, the guide-engaging edge 120 of a link plate is provided with a plurality of straight, parallel grooves 122 arranged in oblique relation to the direction of travel of the chain, and in and alternating relationship with guide-engaging surface portions 121 along the direction of travel. In the link plate having the modified groove configuration of FIG. 6, flux of the lubricating oil occurs within the groove 122 when the chain travels, so that the oil is supplied more smoothly and stably. Accordingly, the link plate avoids a shortage of lubricant between the link plate and the guide that might otherwise occur, and also reduce vibration, noise, wear, and heating of the chain, improves durability, and allows the size and weight of the chain to be reduced.

Alternatively, as shown in FIG. 7a, curved grooves 132 may be provided in a guide-engaging edge 130 alternating with surface portions 131 in the direction of travel of the chain. In another alternative, shown in FIG. 7b, bent, chevron-shaped, grooves 142 may be provided in a guide engaging edge 140 alternating with surface portions 141 in the direction of travel of the chain.

Flux of the lubricating oil within the grooves 132 and 142, which occurs as the chain travels is smoother when the central parts of the grooves 132 and 142 project forward in the direction of chain travel.

The plan-view shape of the grooves is not limited to the particular arrangements described above, and the grooves can be formed in any shape as long as the guide-engaging edge of the link plate is provided with a plurality of surface portions and a plurality of grooves in alternating relationship along the direction of travel of the chain.

Various cross-sectional shapes of the grooves can be adopted as long as the grooves are capable of retaining lubricating oil. Thus, the grooves can be triangular as in FIG. 8a, semi-circular as in FIG. 8b, and trapezoidal as in FIG. 8c.

Figure 9:
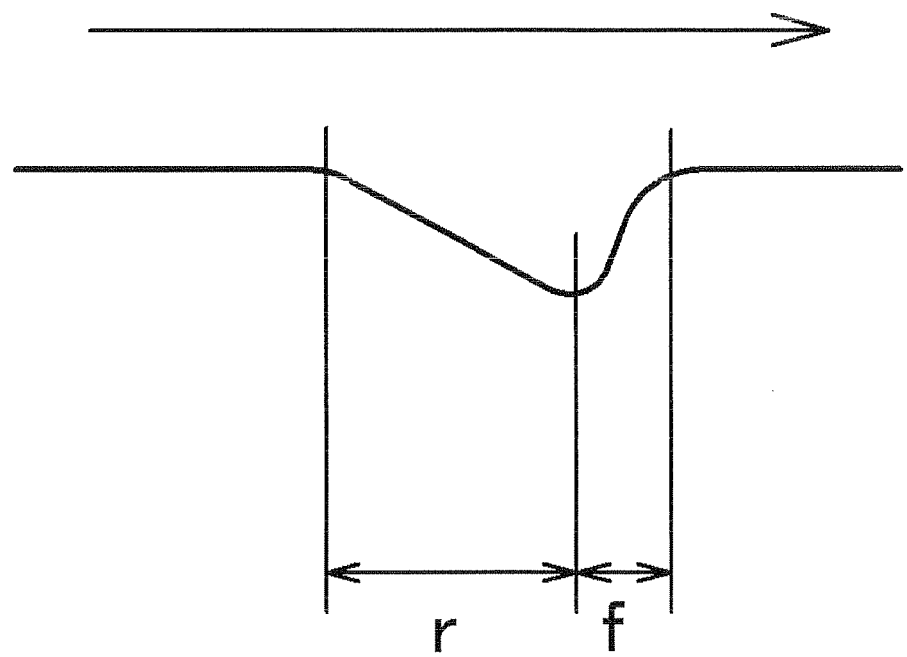
FIG. 9 is a side elevational view illustrating the sectional profile of another modified groove of a link plate according the invention.

As shown in FIG. 9, it is possible to supply the lubricating oil smoothly and stably by groove cross-section such that the distance f between the front edge of the groove in the direction of travel and the deepest portion is shorter than the distance between the deepest portion and the rear edge of the groove so that the slope of the portion of the groove between the deepest portion and the rear edge is gradual. Shortage or loss of lubricant between the link plate and the guide that could otherwise occur is avoided. Vibration, noise, wear and heating of the chain are reduced, the durability of the chain is improved, and it is possible to reduce the size and weight of the chain.

Figure 8A:
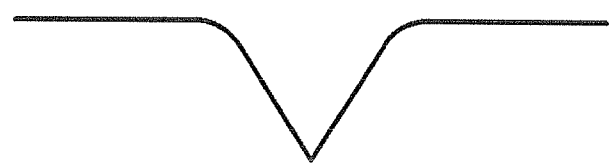
FIGS. 8a, 8b and 8c are side elevational views illustrating sectional profiles of modified grooves of a link plate according to the invention.
Figure 8B:
Figure 8C:
Figure 10:
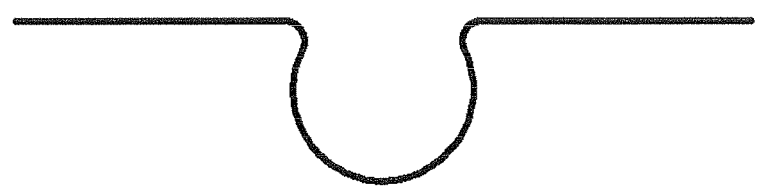
FIG. 10 is a side elevational view illustrating the sectional profile of still another modified groove of a link plate according the invention.

As shown in FIG. 10 it is also possible to retain a greater amount of lubricating oil in a groove having a given width at the guide-engaging edge by forming the groove so that its cross-sectional shape is in the form of a circular arc subtending an angle greater than the 180 degree angle subtended by a semicircular arc as in FIG. 8b. The cross-sectional area in FIG. 10 is substantially larger than that of groove having a triangular cross-sectional shape formed when the front and rear edges of the groove are connected with the deepest portion by straight lines as shown in FIG. 8a. The grooves, of course, can have any cross-sectional shape, and the cross-sectional shapes of the grooves are not limited to the modifications shown in FIGS. 8a-10.

The grooves allow the area of the link plate edge that directly contacts the guide to be reduced, and also retain lubricant. Moreover, the alternation of the surface portions and the grooves along the direction of chain travel allows lubricating oil to be retained and to be stably supplied to the guide-contacting surface portions in the both the widthwise and traveling directions. Accordingly, the link plate avoids shortages of lubricant between the link plate and the guide independently of various conditions such as the speed of the travel chain, transmission torque and lubricant viscosity. The link plate of the invention also reduces vibration, noise, wear and heating of the chain, improves the durability of the chain, and allows downsizing and weight reduction.

The link plate of the invention may take any of various forms as long as the link plate has a guide-contacting edge for direct sliding contact with a chain guide, and the guide-contacting edge is composed of a plurality of surface portions in alternating relationship with a plurality of grooves along the direction of chain travel.

The advantages of the invention can be realized in link plates of various types of transmission chains including roller chains, bushing chains, and even silent chains, as long as the link plates have edges that travels in direct sliding contact with a guide. The link plates can formed into any of various shapes, such as the oval shapes, a gourd-like shape, and can have teeth on an edge which is either on the outside or on the inside of a loop formed when the link plates are connected to form an endless transmission chain.

The lubricant for use with the link plates of the invention can have any of various constituents and physical properties, and can even consist of high viscosity grease.

What is claimed is:

1. A link plate for a transmission chain composed of a plurality of link plates flexibly connected to one another, each of said link plates having first and second parallel, opposite, side faces and a guide-contacting edge surface extending from said first side face to said second side face, and being positioned in relation to all other parts of said each of said link plates so that said guide-contacting edge surface is capable of direct sliding contact with a chain guide, wherein said guide-contacting edge surface is composed of a plurality of guide-engaging surface portions in alternating relationship with a plurality of grooves along the direction of chain travel, each of said surface portions having a convex profile when viewed in a direction perpendicular to said first and second side faces, each of said grooves extending from said first side face to said second side face and separating one of said surface portions from another of said surface portions, each of said surface portions being situated between two of said grooves and meeting one of said two grooves at a first end point and meeting the other of said two grooves at a second end point spaced from said first end point, and said surface portions lying in, and conforming to, an imaginary continuous surface having a continuously convex curved profile when viewed in a direction perpendicular to said opposite side faces, whereby each of said surface portions can come into sliding contact with a surface of a chain guide.

2. The link plate according to claim 1, wherein said edge is elongated in the direction of chain travel and wherein each of said grooves extends from said first side face to the said second side face along a direction, in said guide-contacting edge surface, that deviates from a direction orthogonal to said first and second side faces.

3. The link plate according to claim 1, wherein the transverse cross-sectional shape of each groove is asymmetric and formed so that a distance between a front edge of the groove in a direction of travel and a deepest portion of the groove is shorter than the distance between a rear edge and said deepest portion.

4. The link plate according to claim 1, wherein a transverse cross-sectional shape of each groove has an area larger than the area of a triangle formed by connecting front and rear edges of said groove with a deepest portion of said groove by straight lines.

5. The link plate according to claim 1, wherein said grooves are uniformly spaced from one another whereby the lengths of those of said surface portions that are situated between grooves of said plurality of grooves, when measured from the first end point to the second end point of each said surface portion along directions parallel to said first and second side faces, are equal.

\* \* \* \* \*